United States Patent [19]

Rigby

[11] Patent Number: 4,901,487
[45] Date of Patent: Feb. 20, 1990

[54] CABLE DUCTING FLOOR SYSTEM

[76] Inventor: Ralph A. Rigby, 307-8, Henry Lawson Business Centre, Birkenhead Point, Drummoyne, New South Wales, 2047, Australia

[21] Appl. No.: 265,796
[22] PCT Filed: Dec. 7, 1987
[86] PCT No.: PCT/AU87/00414
§ 371 Date: Aug. 3, 1988
§ 102(e) Date: Aug. 3, 1988
[87] PCT Pub. No.: WO88/04346
PCT Pub. Date: Jun. 16, 1988

[30] Foreign Application Priority Data

Dec. 8, 1986 [AU] Australia ............... PH9385

[51] Int. Cl.$^4$ .............................. E04B 5/48
[52] U.S. Cl. .......................... 52/221; 52/798
[58] Field of Search ............ 52/177-182, 52/98-100, 334, 630, 796-799, 221, 671-674

[56] References Cited

U.S. PATENT DOCUMENTS

| | | | |
|---|---|---|---|
| 1,091,214 | 3/1914 | Gruber | 52/177 |
| 2,050,074 | 8/1936 | Trytten | 52/796 |
| 3,886,702 | 6/1975 | Fork | 52/221 |
| 4,454,692 | 10/1981 | Ault | 52/221 |
| 4,499,332 | 2/1985 | Shea et al. | 52/221 |
| 4,523,416 | 6/1985 | Payne et al. | 52/221 |
| 4,554,771 | 11/1985 | Marwah et al. | 52/221 |
| 4,726,159 | 2/1988 | Stohs | 52/100 |

FOREIGN PATENT DOCUMENTS

| | | | |
|---|---|---|---|
| 120216 | 8/1945 | Australia | 52/798 |
| 593361 | 12/1963 | Australia . | |
| 519266 | 10/1968 | Australia . | |
| 4326479 | 10/1979 | Australia . | |
| 7798987 | 12/1987 | Australia . | |
| 1077164 | 4/1954 | France | 52/798 |
| 2141464 | 12/1984 | United Kingdom . | |

*Primary Examiner*—James L. Ridgill, Jr.
*Attorney, Agent, or Firm*—Paul & Paul

[57] ABSTRACT

A flooring module comprised of an upper member and a lower member to be assembled with like modules to provide a flooring, an array of parallel passageways for specific purposes in the upper member defined by bottoms and sides overlying an array of passageways for like specific purposes in the lower member lying at an angle to the passageways in the upper member and defined by bottoms and sides, and provided with communications openings between corresponding purpose passageways in the upper and lower members and further provided with discrete access means in the upper member which overlie the communication openings.

8 Claims, 3 Drawing Sheets

CABLE DUCTING FLOOR SYSTEM

This invention relates to a flooring system to facilitate the installation of cables for the supply of power, for data transmission and telecommunications and for other purposes, as may be required by a building designer.

Office buildings were once constructed with supply ducts in the framework or mounted as conduits on the surface of walls ceilings and in the floors. With the advent of office equipment requiring large numbers of cables for the supply of power and the transmission of information the conduit system was unable to cope with number of cables required and there was no system whereby the large number of cables could be unobtrusively connected to a multiplicity of locations in modern open-planned offices. In an effort to overcome this problem false ceilings were installed with the cables located thereabove and floor to ceiling posts with cable ducts inside were provided to deliver the cables to the equipment. This was not very satisfactory.

The subsequent development was to provide a false flooring system for a building wherein there were ducts to house cables and the connection of machines was then simple. The false flooring systems could be incorporated as part of a new building or could be fitted to a building which was of older type and which could by means of the false flooring be brought up to a standard required by the modern electronic offices of today.

Many false flooring systems have been developed and the objective has always been to facilitate the connection of equipment to the cables therein and at the same time to provide cable ducts that were isolated from each other so that there was no possibility, for example, of data transmission cables being in the same duct as power supply cable, or telecommunications cables being in the same duct as data or power cables. This latter requirement has presented problems in distribution of the cables for the various purposes.

This invention provides a module which can be assembled with other like modules to form a false floor through which there is a ducting network allowing cables for a mulitplicity of services to be threaded to selected outlet positions with the service cables completely isolated from cables of unlike type. The assembled modules also provide a walk-on facility and if desired a decorative, soundproof or other covering may be placed thereover. In its elemental form the false floor can be used for walking traffic without a covering.

In its presently preferred form the module is made from roll formed sheet metal and the upper surface has surface roughnesses to facilitate grip for walking traffic or for a covering placed thereover. The surface roughnesses may also provide structural rigidity to the modules allowing them to be made from a material of thinner section than would otherwise be possible.

As will be understood, with the flooring system of the present invention and unlike other known cable access floors, there is no need to raise the decking modules to give access to the distribution system of cables. The present invention ensures the integrity of the individual cable types and ensures segregation. The modular system of flooring panels with dedicated cable channels ensures that every location on a flooring lies only a small predetermined distance from a duct for each cable type. By means of the present invention flooring of versatility previously unknown is now available to building designers.

Broadly the invention can be said to comprise a rectangular flooring module including an upper face with an array of parallel specific purpose passageways therebelow which overlie a lower array of parallel passageways having like specific purposes with the axes of the upper passageways at an angle to the axes of the lower passageways, and discrete access means in said upper face respectively overlying communication openings between upper and lower passageways for the same specific purpose.

A presently preferred embodiment of the invention will now be described with reference to the accompanying drawings in which.

Figure 1:
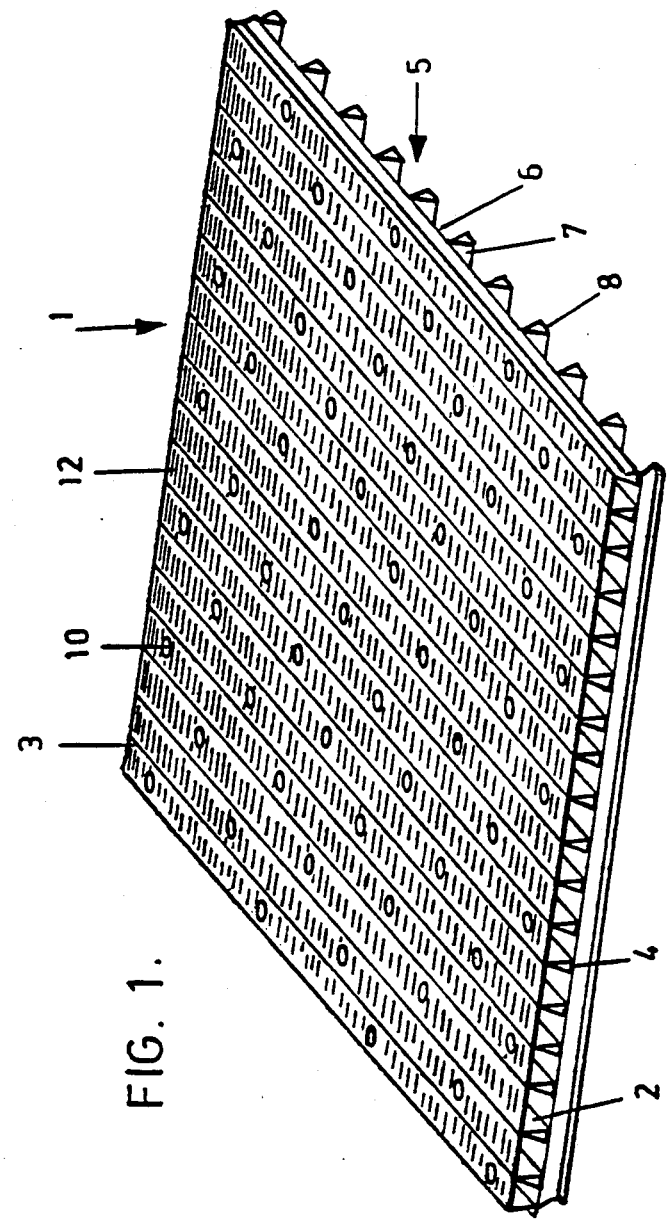
FIG. 1 is a perspective view of a flooring module according to the invention.

Referring to FIG. 1 the module comprises a roll formed metal member 1 in the form of a plurality of inverted channels with the walls 2 and bottoms 3 and the walls are of general isosceles triangular shape having a bottom 4 of the triangle as a load bearing foot. There is a like member 5 with channels bottoms 6, walls 7 and wall feet 8 located below the first member 1. The feet 4 are fixed to the outer surface of the channel bottoms 6 as by gluing, rivetting, welding, or in any other practical manner, so the channels of the members 1 and 5 are at right angles. It is to be understood that the right angle relationship of the axes of the channels is preferred but not essential.

From the foregoing it will be seen that there is thus formed an upper array of upper passageways each having a top, a bottom and sides and there is an array of lower passageways each having a top and sides. The bottom of the lower passageways is formed by the surface, eg. the building floor, upon which the modules are placed to form a false floor.

Figure 2:
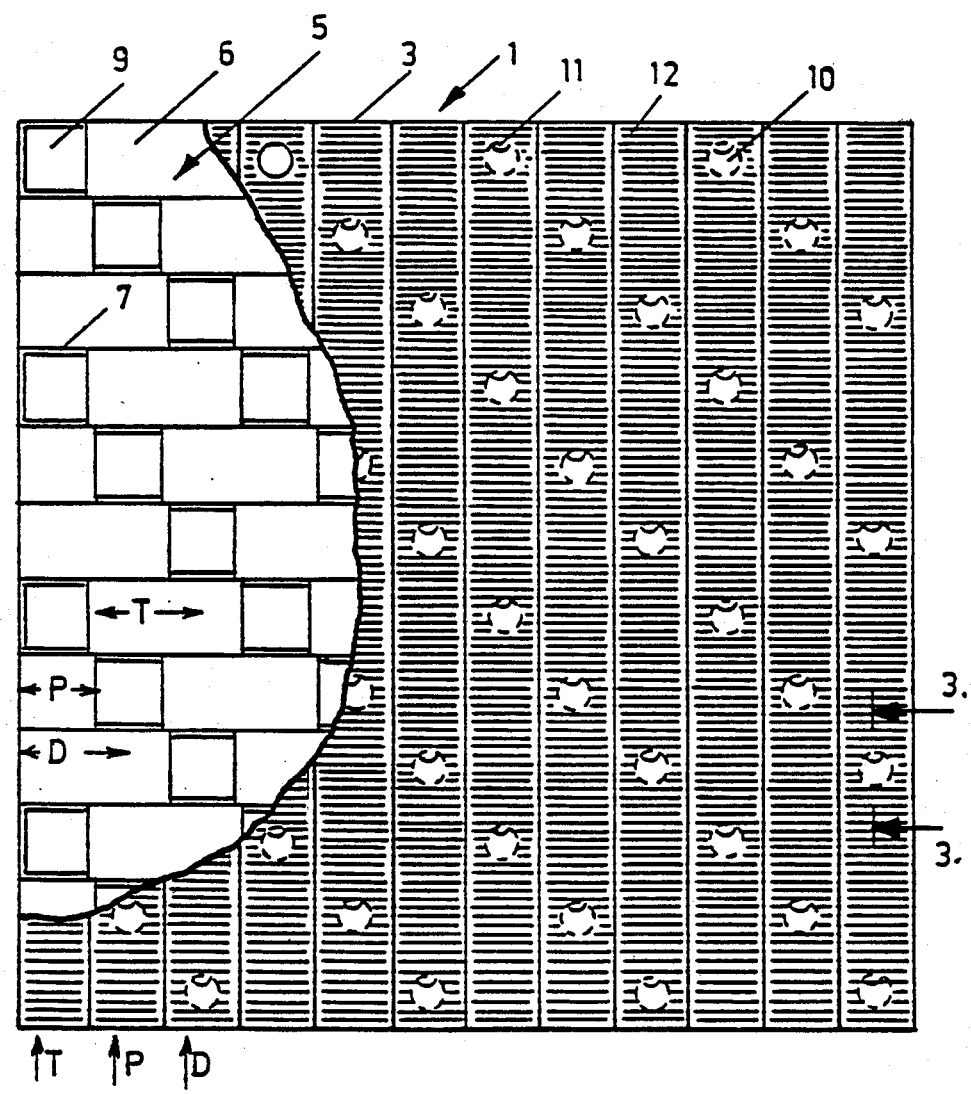
FIG. 2 is a plan view of the module on FIG. 1 with portion of the top surface broken away and FIG. 3 is an enlarged fragmentary elevation on the section line 3—3 of FIG. 2.
Figure 3:
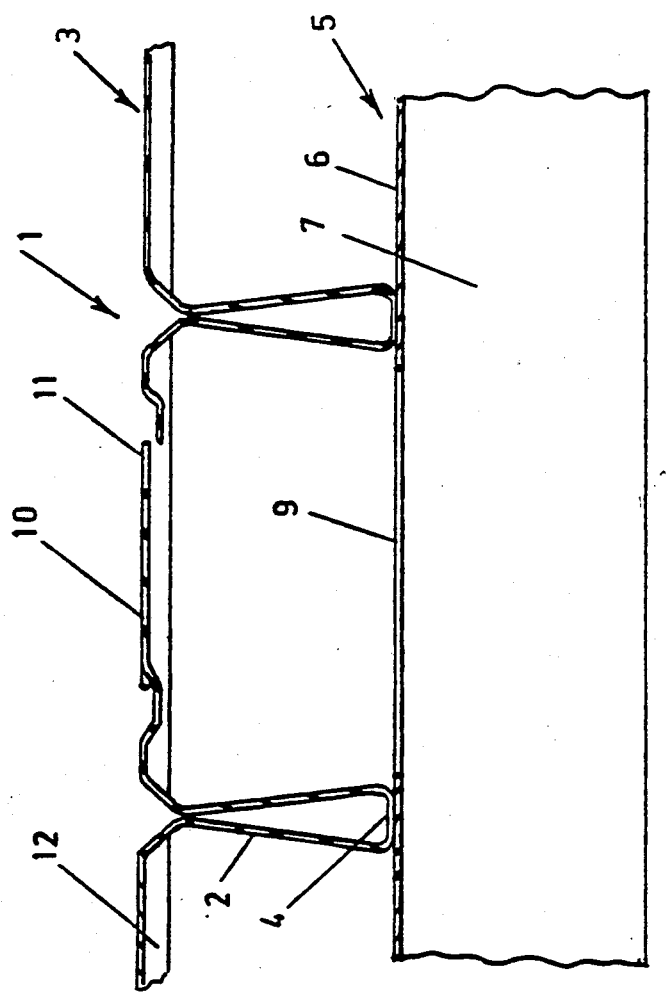

It is the intention of the present invention to allow cables of different types to be threaded through the false floor so unlike cables are isolated from each other and to allow selected cables to exit the false floor for connection to machines, power and telephone outlets and the like. To facilitate this cable must be able to run in both directions in the floor. Referring to FIG. 2 which is a plan view of a module including a cut-away portion to expose the bottoms 6 of the channels of the member 5. There are openings 9 in the channel bottoms 6 are predetermined positions as will now be explained.

Assuming that three cable types are to be threaded through the modules, for example, data, power and telephone cables. If these were designated specific purpose channels D, P & T in a repeating pattern throughout the channels of the upper and lower members and the openings 9 were made where the corresponding designations occured then the arrangement of FIG. 2 would be achieved. In effect the openings 9 are in parallel rows diagonally across the module. If there were two, or four or any number of cable types to be threaded through the modules the concept would remain the same only the number of diagonal rows of holes per module would change.

This is a preferred arrangement for universality of use and manufacture of the modules. Naturally special purpose modules can be made with openings 9 as required it being the only requirement that in use like cables be used in like purpose channels that are provided with the openings 9 at intersections.

There are discrete access means in the bottoms 3 of the inverted channels of the member 1 aligned with the openings 9. The term access means has been used to provide generality for the feature. In the preferred arrangement as illustrated the access means comprises at each intersection aligned with an opening 9 a partly pressed out circular members 10 which are held to the bottoms 3 by frangible connections formed in the pressing operation.

The connections can be of many types which are able to be fractured by the application of force. In one example a male and female punch set is used where the male component is smaller than the opening in the female component by an amount less than the thickness of the material and the penetration of the punch into the die opening is less than the thickness of the material. The punching operation thus forms between the slug displaced by the punch and the member 3 a frangible membrane. To facilitate the application of force a "half-moon" cutout 11 is formed in the slug 10 allowing the blade of a screwdriver or the like to be inserted and by using the screwdriver as a lever the slug 10 is dislodged. In use where a slug 10 is removed and a cable does not exit, for example if a mistake is made, or where a cable is redirected to another loaction a plastic plug could be inserted to replace the slug 10.

The bottoms 3 of the channels 1 are preferably made with corrugations 12 to provide a strengthening effect for the metal used thereby allowing a thinner gauge to be used than would otherwise be the case. The corrugations also provide an anti-slip surface for persons walking on the modules and in the case where an overlay is mounted on the module the corrugations provide a grip for the overlay or an anchoring point for any adhesive used to maintain the overlay in place.

I claim:

1. A rectangular flooring module for assembly with like modules on a support means to provide a false floor complete with bi-directional building services ducting, said module having a substantially continuous upper load bearing surface, a planar array of parallel side-by-side service passageways immediately below said upper surface, each passageway being allocated for one or other of the building services, a planar array of parallel side-by-side downwardly open service channels immediately below said services passageways, each channel being allocated for one or other of the building services, the axes of the service passageways lying at an angle to the axes of the service channels, access openings between said service passageways and said service channels located at each crossover of like service allocated service passageways and service channels, and access means in said upper surface to allow access to said service passageways and respectively aligned with said access openings.

2. A flooring module as claimed in claim 1 wherein said access means are holes.

3. A flooring module as claimed in claim 1 wherein the module comprises a first multi-channel member with the channels downwardly open fixed to a substantially continuous rear face of a second multi-channel member with its channels downwardly open, said rear face combining with sides and bottoms of the channels of the first member to provide said service passageways.

4. A flooring module as claimed in claim 3 wherein the multi-channel members are constructed from formed sheet metal.

5. A flooring module as claimed in claim 3 in which the walls of each of said service channels downwardly converge to provide bearing faces for the module which extend between terminal edges of adjacent walls of adjacent channels.

6. A flooring module as claimed in claim 1 wherein said access means are holes occluded by removable members.

7. A flooring module as claimed in claim 6 including frangible connections connecting the removable members and the flooring module.

8. A flooring module as claimed in claim 7 including portions of the module upper surface partially severed therefrom so as to form said removable members and said frangible connections.

* * * * *